(12) United States Patent
Zhang et al.

(10) Patent No.: US 12,378,614 B2
(45) Date of Patent: Aug. 5, 2025

(54) METHOD FOR IRON MAKING BY CONTINUOUS SMELTING REDUCTION

(71) Applicants: Northeastern University, Shenyang (CN); DONGDA NONFERROUS SOLID WASTE TECHNOLOGY RESEARCH INSTITUTE (LIAOLING) CO., LTD, Shenyang (CN)

(72) Inventors: Tingan Zhang, Shenyang (CN); Zhihe Dou, Shenyang (CN); Yan Liu, Shenyang (CN); Guozhi Lv, Shenyang (CN); Qiuyue Zhao, Shenyang (CN); Zimu Zhang, Shenyang (CN)

(73) Assignees: NORTHEASTERN UNIVERSITY, Shenyang (CN); DONGDA NONFERROUS SOLID WASTE TECHNOLOGY RESEARCH INSTITUTE (LIAOLING) CO., LTD, Shenyang (CN)

(*) Notice: Subject to any disclaimer, the term of this patent is extended or adjusted under 35 U.S.C. 154(b) by 540 days.

(21) Appl. No.: 17/904,589

(22) PCT Filed: Feb. 2, 2021

(86) PCT No.: PCT/CN2021/074867
§ 371 (c)(1),
(2) Date: Aug. 18, 2022

(87) PCT Pub. No.: WO2021/164543
PCT Pub. Date: Aug. 26, 2021

(65) Prior Publication Data
US 2023/0082269 A1    Mar. 16, 2023

(30) Foreign Application Priority Data
Feb. 21, 2020 (CN) .......................... 202010108136.X

(51) Int. Cl.
C21B 3/02 (2006.01)
C21B 13/00 (2006.01)
C21C 1/06 (2006.01)

(52) U.S. Cl.
CPC ............ C21B 3/02 (2013.01); C21B 13/0013 (2013.01); C21B 13/004 (2013.01); C21C 1/06 (2013.01)

(58) Field of Classification Search
CPC ..... C21B 3/02; C21B 13/0013; C21B 13/004; C21B 13/008; C21B 13/0066;
(Continued)

(56) References Cited

U.S. PATENT DOCUMENTS

| | | |
|---|---|---|
| 3,963,483 A | 6/1976 | Mathesius et al. |
| 4,014,682 A | 3/1977 | Majewski |
| 2019/0230746 A1* | 7/2019 | Zhang ..................... C21B 11/10 |

FOREIGN PATENT DOCUMENTS

| | | |
|---|---|---|
| CN | 101348842 A | 1/2009 |
| CN | 102409124 A | 4/2012 |

(Continued)

*Primary Examiner* — Danielle M. Carda
(74) *Attorney, Agent, or Firm* — Muncy, Geissler, Olds & Lowe, P.C.

(57) ABSTRACT

A method for iron making by continuous smelting reduction, including: (1) mixing iron-containing mineral powder with a reducing agent and a slag former to obtain mixed powder materials; (2) placing furnace startup materials in a reducing furnace, and heating the furnace startup materials to be in a molten state to form a furnace startup molten pool; (3) conveying the mixed powder materials into the reducing furnace, and blowing oxidizing combustibles into the reducing furnace for heating; (4) performing stirring by a stirring paddle to form a molten slag layer and a molten iron layer; and performing stirring so that a vortex is formed in the molten slag layer; and (5) adjusting a position of the stirring paddle, a stirring speed and a conveying quantity of the (Continued)

mixed powder materials to enable the molten iron and the reduced molten slag to be respectively continuously discharged.

5 Claims, 1 Drawing Sheet

(58) Field of Classification Search
CPC ..... C21B 13/0006; C21C 1/06; Y02P 10/134; Y02P 10/143
USPC .......................................................... 75/503
See application file for complete search history.

(56) References Cited

FOREIGN PATENT DOCUMENTS

| | | |
|---|---|---|
| CN | 102618684 A | 8/2012 |
| CN | 203848667 U | 9/2014 |
| CN | 104120209 A | 10/2014 |
| CN | 106435080 A | 2/2017 |
| CN | 106705664 A | 5/2017 |
| CN | 111394534 A | 7/2020 |

* cited by examiner

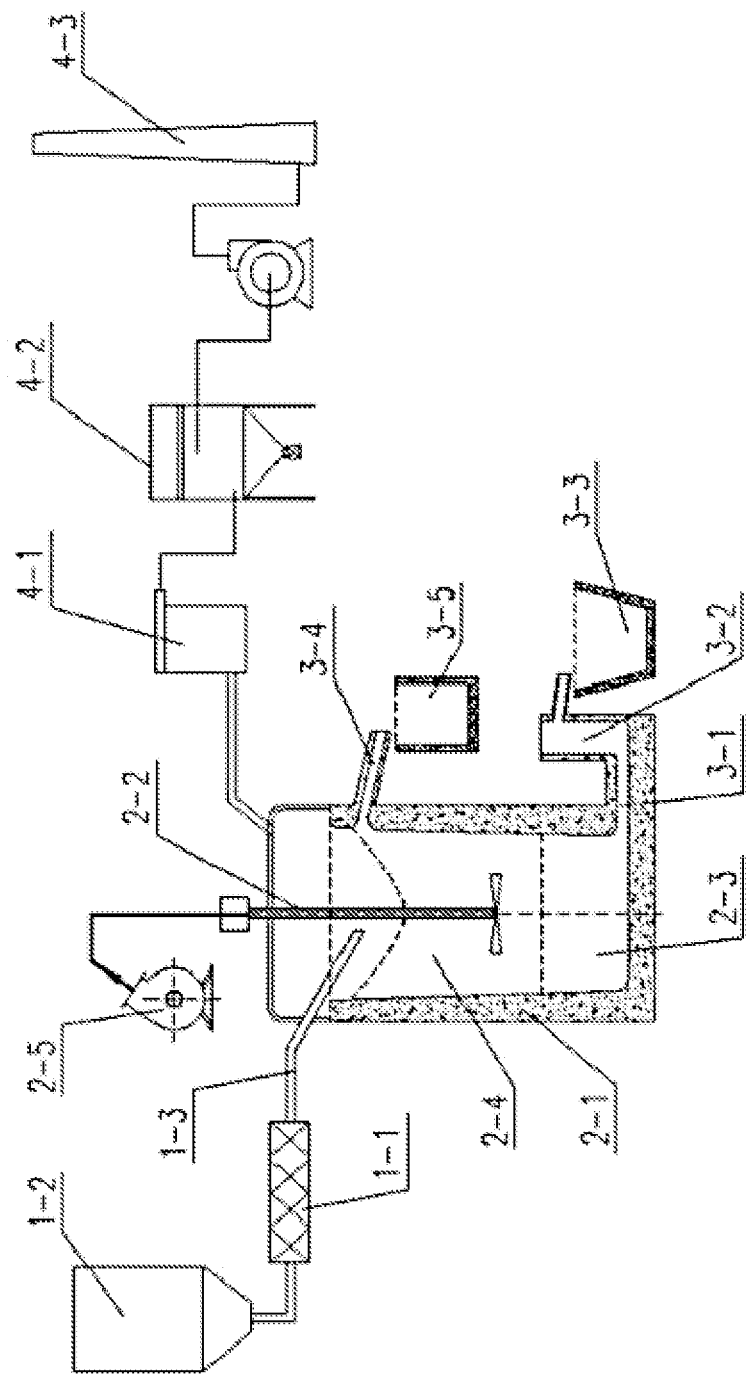

METHOD FOR IRON MAKING BY CONTINUOUS SMELTING REDUCTION

BACKGROUND OF THE INVENTION

1. Field of the Invention

The invention relates to the technical field of metallurgy, and particularly relates to a method for iron making by continuous smelting reduction.

2. The Prior Arts

With the high demand for steel production capacity and increasingly strict requirements for environmental protection, how to reduce the cost and improve the working environment is the top priority. A reducing agent for blast furnace iron making is mainly anthracite pulverized coal, which is blown into a blast furnace from a tuyere. Due to low density of the pulverized coal, during the reaction process, a large amount of the pulverized coal floats on the surface and cannot react well with iron oxides. The utilization rate of the pulverized coal is low, and generated flue gas contains a large amount of unreacted dust, which not only wastes raw materials, but also has a bad impact on the atmosphere and site environment.

At present, although the maturity of a blast furnace iron making technology has made the iron making cost tend to be stable, improvement of local conditions can only change the cost of pig iron in a small range, and the profit margin is very small. Therefore, iron making is used as an important part of iron and steel production, how to achieve non-coke low-carbon clean smelting has always been the goal of short-process green steel smelting, and melting reduction iron making, such as a pre-reduction-smelting separation two-step smelting reduction technology represented by COREX, is currently the most popular new iron making technology. In addition, in terms of technological operation and equipment development, continuous smelting reduction technological operation and equipment are also hot spots and difficulties in research. For example, Chinese patent application Nos. 201110374492.7, 201210112813.0 and other patents all disclose technological equipment for iron making through continuous reduction, capable of performing automatic and continuous operations. But, parts of making pellets, sintering pellets and performing pre-reduction, reduction and smelting separation, and the like are still needed, and sustained and stable continuous reduction operation after feeding is not really realized.

Therefore, the development of a real continuous reduction iron making technology and equipment is still a technical problem that must be faced and solved in the future non-blast furnace green iron making. Chinese patent application No. 201420208229.X discloses an intermediate frequency furnace capable of continuously discharging materials, and Chinese patent application No. 201611225035 discloses an induction furnace for continuous high-temperature molten rock/mineral wool raw materials, which both are not suitable for pelletizing and sintering-pre-reduction-reduction smelting separation iron making operations. Chinese patent application No. 201610854514.2 discloses "Method for iron making by vortex stirring and melting reduction," wherein the method combines the advantages of a KR stirring desulfurization technology, a pelletizing and sintering-blast furnace reduction and pre-reduction-reduction smelting separation iron making technology is completely changed, a pellet sintering technology is cancelled, the technological breakthrough of powder materials being directly fed into a furnace and high-efficiency reduction is realized, the grade requirements for iron-containing resources are greatly reduced, and the method has been successfully applied to effective comprehensive utilization of low-grade non-traditional iron ore resources such as iron-containing tailings and iron-containing refining tailings. However, the patent only realizes the vortex stirring and melting reduction of iron-containing resources. In operation, a molten iron outlet is an open outlet formed in the bottom of a reducing furnace; due to refining operation in the molten state, the molten iron outlet needs to be blocked during the feeding reduction refining process; and therefore, only intermittent operation can be used, that is, stirring and high-temperature reduction smelting are performed after the furnace is full of materials each time, then stirring is stopped, and molten iron is discharged. In order to ensure smelting environment, and in order to ensure balanced metal slag atmosphere required for refining in the actual smelting process, a slag discharge opening also needs to be blocked, slag discharge and molten iron discharge are also performed once after each refining completion of the furnace. Therefore, only direct feeding of powder materials into the furnace for reduction is realized, and continuous melting reduction in thermodynamics is not realized.

SUMMARY OF THE INVENTION

The invention aims to provide a method for iron making by continuous smelting reduction. Through technologies of continuous feeding, continuous reduction and continuous metal slag separation, an existing iron making pellet sintering technology is cancelled, direct feeding of powder materials into a furnace and efficient reduction are realized, stable continuous reduction operation effects are achieved, and breakthrough in a continuous melting reduction principle is realized.

The method disclosed by the invention comprises the following steps:

1. Uniformly mixing iron-containing mineral powder with a reducing agent and a slag former to obtain mixed powder materials, and placing the mixed powder materials in a continuous feeding system which is a device capable of metering conveyed materials, and selects a screw feeder or a feeding bin with a metering pump.
2. Placing furnace startup materials in a reducing furnace, wherein a seal cover is assembled at a top of the reducing furnace, a stirring device is arranged at the top of the reducing furnace, the stirring device and a lifting device outside the reducing furnace are assembled together, a shaft rod of the stirring device penetrates through the seal cover to be inserted in the reducing furnace, a stirring paddle is assembled at a bottom end of the shaft rod, an air inlet channel and an air exhaust opening are also formed in the seal cover, a feed pipe penetrates through the seal cover to be inserted in the reducing furnace, a molten slag overflow opening is formed in an upper part of a side wall of the reducing furnace, an iron notch is formed in a bottom of the reducing furnace and communicates with a siphon pipeline, and the siphon pipeline communicates with a buffer tank; and heating the furnace startup materials to be in a molten state to form a furnace startup molten pool.
3. Lowering the stirring paddle into the furnace startup molten pool through the lifting device, starting the stirring device to stir the furnace startup molten pool, adjusting a position of the stirring paddle through the lifting device, controlling a vertical distance between the stirring paddle and a liquid level of the furnace startup molten pool to be ⅓-½ of a height of the furnace startup molten pool, at the same time, enabling the continuous feeding system to continuously convey the mixed powder materials into the reducing furnace through the feed pipe, and blowing the oxidizing combustibles into the reducing furnace through the air inlet channel to heat the mixed powder materials in the reducing furnace, wherein the oxidizing combustibles are the mixture of the pulverized coal and the oxygen, or the mixture of the natural gas and the oxygen, the mixed powder materials are heated to melt in the reducing furnace, the molten mixed powder materials and the furnace startup molten pool form the high-temperature molten pool together, at the same time, the mixed powder materials are subjected to a reduction reaction to generate molten iron and reduced molten slag, and an introduction quantity of the oxidizing combustibles is determined based on a standard of controlling a temperature of the high-temperature molten pool to be greater than or equal to 1450° C.

4. Under an action of a stirring centrifugal force and a coupling action of a gravity difference between the molten iron and the reduced molten slag, enabling the molten iron and the reduced molten slag to be separated quickly to form a molten slag layer in an upper part of the high-temperature molten pool and a molten iron layer in a lower part of the high-temperature molten pool, enabling the molten iron of the molten iron layer to enter the buffer tank from the iron notch through the siphon pipeline, along with an increase of a liquid level height of the high-temperature molten pool, when the molten iron is discharged out of an outlet of the buffer tank, adjusting the position of the stirring paddle through the lifting device, raising the stirring paddle into the molten slag layer, and performing vortex stirring on the molten slag layer through the stirring paddle so that the vortex is formed in the molten slag layer.

5. Adjusting a stirring speed of the stirring paddle and a conveying quantity of the mixed powder materials so that the molten iron can be continuously and stably discharged, and at this time, a liquid level of the molten iron layer remains unchanged; when an upper edge of the vortex in the molten slag layer is located at the molten slag overflow opening, discharging the reduced molten slag through the molten slag overflow opening; adjusting the position of the stirring paddle through the lifting device, so that a vertical distance between the stirring paddle and the liquid level of the molten iron layer is ⅓-½ of a height of the molten iron layer; and adjusting the stirring speed and the conveying quantity of the mixed powder materials, so that the molten iron is continuously discharged out of the outlet of the buffer tank and the reduced molten slag is continuously discharged out of the molten slag overflow opening.

In step 1, the iron-containing mineral powder is iron ore powder, or iron-containing tailing powder or iron-containing smelt slag with full iron grade greater than or equal to 30%.

In step 1, the reducing agent is pulverized coal, the slag former is lime, in the mixed powder materials, a quantity of the reducing agent added is 1.1-1.3 times of a total quantity of C required for a complete reaction of Fe in the iron-containing mineral powder and C in the reducing agent, a quantity of the slag former is 2-3 according to alkalinity of the mixed powder materials (a mass ratio of Cao to $SiO_2$), and reaction formulas of the complete reaction are:

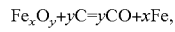

$Fe_xO_y + yC = yCO + xFe$,

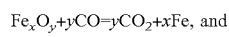

$Fe_xO_y + yCO = yCO_2 + xFe$, and

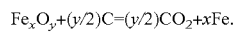

$Fe_xO_y + (y/2)C = (y/2)CO_2 + xFe$.

In step 2, the furnace startup materials are pig iron, or the mixed powder materials in step 1, when the furnace startup materials are made into the furnace startup molten pool, a temperature of the furnace startup molten pool is controlled to be greater than or equal to 1450° C., a volume of the furnace startup molten pool is 20-30% of a total volume of the reducing furnace, when the furnace startup materials are the pig iron, the furnace startup materials are heated in an induced heating manner, when the furnace startup materials are the mixed powder materials, the furnace startup materials are heated in a manner that oxidizing combustibles are blown into the reducing furnace through the air inlet channel, the oxidizing combustibles are a mixture of pulverized coal and oxygen, or a mixture of natural gas and oxygen, and a mass ratio of C elements to O elements in the oxidizing combustibles is 3 to (4-8).

In step 2, an outlet end of the feed pipe is located near the shaft rod, when a vortex is formed in a high-temperature molten pool in step 4, the mixed powder materials entering the reducing furnace fall into a center of the vortex, and at this time, the outlet end of the feed pipe is located above the vortex.

In step 3, the mass ratio of the C elements to the O elements in the oxidizing combustibles is 3 to (4-8).

In step 4, a height-diameter ratio of the vortex is 0.5-2.5 when the vortex is formed, and after the vortex is formed, the mixed powder materials entering the reducing furnace are drawn and sucked into the high-temperature molten pool under an action of negative pressure of the center of the vortex, and are uniformly dispersed under an action of the vortex stirring.

In the method, after refining tail gas produced through a reaction in the reducing furnace is exhausted through the air exhaust opening, the exhausted tail gas enters a waste heat recovery system for waste heat recovery; when the temperature is reduced to 200-300° C., the tail gas after waste heat recovery enters a flue gas purifying system, and carried dust is removed; and finally, the tail gas after dust removal is conveyed into a chimney through a draught fan and is discharged.

In step 4, after being discharged out of the outlet of the buffer tank, the molten iron enters a foundry ladle, secondary refining is performed on the molten iron, and qualified molten iron is obtained for steel making.

In step 5, the reduced molten slag mainly consist of components of CaO, $SiO_2$ and $Al_2O_3$, after being discharged out of the molten slag overflow opening, the reduced molten slag enter a slag ladle, then hardening and tempering as well as annealing are performed, and water quenching is performed, so that cement clinkers are obtained.

In step 4, when the stirring paddle performs the vortex stirring, the stirring speed is 50-200 r/min.

In the above method, an iron reduction rate of the iron-containing mineral powder is greater than or equal to 95.5%, and a mass percentage of iron in the reduced molten slag is less than or equal to 0.35%.

In step 3, the air inlet channel is an independent air inlet channel, or a channel is arranged in the shaft rod of the stirring device to be used as the air inlet channel.

The continuous reduction process comprises steps of continuous feeding, continuous reduction, continuous metal slag separation and the like, and the mixed powder materials are directly fed into the center of the vortex of the molten pool in the reducing furnace by the continuous feeding system capable of performing precise metering. Due to the effect of negative pressure of the center of the vortex, the mixed powder materials are rapidly drawn and sucked in the molten pool, and under the action of stirring, the mixed powder materials are quickly diffused to generate melting reduction. Molten iron and molten slag generated through reduction are quickly separated and respectively discharged, so that direct feeding of the powder materials into the furnace and efficient reduction are realized. The effect of stable continuous reduction operation is achieved, breakthrough of a continuous melting reduction technology principle in thermodynamics is finally realized, and breakthrough of a short-process continuous operation technology from continuous feeding-continuous melting reduction-continuous metal slag separation is realized. The method has the beneficial effects that:

(1) By an iron making technique by continuous melting reduction, an existing iron making pellet sintering technology is cancelled, breakthrough of direct feeding of powder materials into the furnace and efficient reduction is realized, and the process of a traditional blast furnace iron making technology is greatly shortened.

(2) Powdery iron-containing minerals, the reducing agent and the slag former which are well mixed react, and the mixed powder materials are directly fed into the center of a vortex formed through mechanical stirring on the surface of a melt mass through the continuous feeding system, and are drawn into the molten pool immediately. At the same time, when reaction materials which are drawn are stirred, sufficient contact can be obtained, the reaction speed can be increased, and the iron making period can be shortened.

(3) Through the iron making method by continuous melting reduction, critical steps of continuous feeding, continuous reduction, continuous metal slag separation and the like are connected in series, coupled and integrated, so that the technological limitation that a blast furnace iron making technology and existing non-blast furnace melting reduction must be subjected to pellet sintering is thoroughly broken through. Breakthrough of an iron making technology principle by continuous melting reduction on the thermodynamics is realized, and technical breakthrough and innovation of green melting reduction iron making with integrated short-process steady-state operations of continuous feeding, continuous reduction and continuous metal slag separation are realized.

(4) Through an iron making method by continuous melting reduction, the technological limitation that an existing iron making technology (blast furnace and non-blast furnace technology) has strict requirements for the grade of iron ores is overcome. The iron making method by continuous melting reduction not only can be used for treating traditional iron ores but also can be directly used for treatment and comprehensive utilization of low-grade non-traditional iron-containing resources of iron processing tailings, iron-containing smelt slag and the like of which full iron grade is not less than 30% or even lower. A technology and equipment basis is increased for upgrading of technology, technique and equipment of iron and steel industry.

Besides, the iron making method by continuous melting reduction can be used for high-value comprehensive utilization of low-grade iron-containing bulk industrial solid waste of processing iron tailings, iron-containing smelt slags and the like.

(5) Through an iron making method by continuous melting reduction, after metal slag separation, reduced molten slag is discharged into an annealing slag ladle through overflowing from a slag discharge opening in the top of the reducing furnace to be directly subjected to hardening and tempering as well as annealing, then water quenching is performed, and cement clinkers are obtained. Reducing molten iron overflows into the foundry ladle under a siphonage action through a high-temperature pipeline, the molten iron can be directly subjected to secondary refining, and qualified molten iron can be obtained for subsequent iron making technologies, so that technological innovation of slagging-free short-process clean iron making and short-process clean steel making can be realized.

(6) The method is simple in technology, low in investment, energy-saving, environmental-friendly, low in cost and high in economic value, the utilization rate of the reducing agent is greatly increased, and the method is an efficient non-blast furnace iron making technology.

BRIEF DESCRIPTION OF DRAWINGS

The sole FIGURE is a schematic structural diagram of an iron making device by continuous melting reduction according to an embodiment 1 of the invention.

In the drawings, 1-1: screw feeder; 1-2: feeding bin; 1-3: feed pipe; 2-1: reducing furnace; 2-2: stirring device (comprising stirring paddle and shaft rod); 2-3: molten iron layer; 2-4: molten slag layer; 2-5: air compressor; 3-1: siphon pipeline; 3-2: buffer tank; 3-3: foundry ladle; 3-4: molten slag overflow opening; 3-5: slag ladle; 4-1: waste heat recovery system; 4-2: flue gas purifying system; 4-3: chimney.

DETAILED DESCRIPTION OF THE PREFERRED EMBODIMENT

In the embodiments of the invention, oxidizing combustibles are blown and introduced through an air compressor.

In the embodiments of the invention, iron-containing mineral powder is iron ore powder, or iron-containing tailing powder or iron-containing smelt slag with iron grade greater than or equal to 30%.

In the embodiments of the invention, the reaction formula of a complete reaction is:

$$Fe_xO_y + yC = yCO + xFe,$$

$$Fe_xO_y + yCO = yCO_2 + xFe, \text{ and}$$

$$Fe_xO_y + (y/2)C = (y/2)CO_2 + xFe.$$

In the embodiments of the invention, the outlet end of a feed pipe is located near a shaft rod, when a vortex is formed in a high-temperature molten pool, mixed powder materials entering a reducing furnace fall into the center of the vortex, and at this time, the outlet end of the feed pipe is located above the vortex.

In the embodiments of the invention, after being discharged out of the outlet of a buffer tank, molten iron enters a foundry ladle, and secondary refining is performed on the molten iron, so that qualified molten iron is obtained for steel making.

In the embodiments of the invention, reduced molten slag mainly consists of components of CaO, $SiO_2$ and $Al_2O_3$, after being discharged out of a molten slag overflow opening, the reduced molten slag enters a slag ladle, then hardening and tempering as well as annealing are performed, water quenching is performed, and cement clinkers are obtained.

In the embodiments of the invention, when a stirring paddle performs vortex stirring, the stirring speed is 50-200 r/min.

In the embodiments of the invention, the iron reduction rate of the iron-containing mineral powder is greater than or equal to 95.5%, and the mass percentage of iron in the reduced molten slag is less than or equal to 0.35%.

In the embodiments of the invention, the temperature of a furnace startup molten pool and the high-temperature molten pool is 1450-1550° C.

In the embodiments of the invention, the shaft rod is located at the axis of the reducing furnace.

Embodiment 1

The structure of the adopted device, as shown in the sole FIGURE, comprises a feeding bin 1-2, a screw feeder 1-1, a reducing furnace 2-1, a stirring device 2-2, a buffer tank 3-2, a waste heat recovery system 4-1, a flue gas purifying system 4-2 and a chimney 4-3, wherein a seal cover is assembled at the top of the reducing furnace 2-1, the stirring device 2-2 and a lifting device outside the reducing furnace 2-1 are assembled together, a shaft rod of the stirring device 2-2 penetrates through the seal cover to be inserted into the reducing furnace 2-1, and a stirring paddle is assembled at the bottom end of the shaft rod of the stirring device 2-2.

The outlet of the feeding bin 1-2 communicates with the inlet of the screw feeder 1-1, the outlet of the screw feeder 1-1 communicates with the inlet of the feed pipe 1-3, and the feed pipe 1-3 penetrates through the seal cover to be inserted into the reducing furnace 2-1.

An air exhaust opening is formed in the seal cover; a molten slag overflow opening 3-4 is formed in the upper part of the side wall of the reducing furnace 2-1, an iron notch is formed in the bottom of the reducing furnace 2-1 and communicates with a siphon pipeline 3-1, and the siphon pipeline 3-1 communicates with the bottom of the buffer tank 3-2.

A channel is arranged in the shaft rod of the stirring device 2-2 to be used as an air inlet channel, and the air inlet channel communicates with the air compressor 2-5.

The bottom end of a molten slag overflow opening 3-4 is opposite to a slag ladle 3-5, and the bottom end of a pipeline extending out of the outlet of the buffer tank 3-2 is opposite to the foundry ladle 3-3.

The air exhaust opening communicates with the waste heat recovery system 4-1 through a pipeline, the waste heat recovery system 4-1 communicates with the flue gas purifying system 4-2 through the pipeline, the flue gas purifying system 4-2 communicates with a draught fan, and the outlet of the draught fan communicates with the chimney 4-3.

When the above device is adopted, iron-containing mineral powder, a reducing agent and a slag former are uniformly mixed to obtain mixed powder materials, the mixed powder materials are placed in a screw feeder of a continuous feeding system, the reducing agent is pulverized coal, the slag former is lime, in the mixed powder materials, the quantity of the reducing agent added is 1.1 times of the total quantity of C required for the complete reaction of Fe in the iron-containing mineral powder and C in the reducing agent, and the quantity of the slag former is 2 according to the alkalinity of the mixed powder materials.

The furnace startup materials are placed in the reducing furnace, and are heated to be in a molten state to form a furnace startup molten pool, the furnace startup materials are pig iron, when the furnace startup materials are made into the furnace startup molten pool, the temperature of the furnace startup molten pool is controlled to be greater than or equal to 1450° C., the volume of the furnace startup molten pool is 20% of the total volume of the reducing furnace, and the furnace startup materials are heated in an induced heating manner.

The stirring paddle is lowered into the furnace startup molten pool through the lifting device, the stirring device is started to stir the furnace startup molten pool, the position of the stirring paddle is adjusted through the lifting device, the vertical distance between the stirring paddle and the liquid level of the furnace startup molten pool is controlled to be ⅓ of the height of the furnace startup molten pool, at the same time, the continuous feeding system continuously conveys the mixed powder materials into the reducing furnace through the feed pipe, and the oxidizing combustibles are blown into the reducing furnace through the air inlet channel to heat the mixed powder materials in the reducing furnace, the oxidizing combustibles are a mixture of the pulverized coal and the oxygen, the mixed powder materials are heated to melt in the reducing furnace, the molten mixed powder materials and the furnace startup molten pool form the high-temperature molten pool together, at the same time, the mixed powder materials have a reduction reaction to generate molten iron and reduced molten slag, the introduction quantity of the oxidizing combustibles is determined based on the standard of controlling the temperature of the high-temperature molten pool to be greater than or equal to 1450° C., and the mass ratio of C elements to O elements in the oxidizing combustibles is 3 to 4.

Under the action of a stirring centrifugal force and the coupling action of a gravity difference between the molten iron and the reduced molten slag, the molten iron is quickly separated from the reduced molten slag, then a molten slag layer in an upper part of the high-temperature molten pool and a molten iron layer in a lower part of the high-temperature molten pool are formed, the molten iron of the molten iron layer enters the buffer tank from the iron notch through the siphon pipeline, along with the increase of the liquid level height of the high-temperature molten pool, when the molten iron is discharged out of the outlet of the buffer tank, the position of the stirring paddle is adjusted through the lifting device, the stirring paddle is raised into the molten slag layer, and vortex stirring is performed on the molten slag layer through the stirring paddle, so that the vortex is formed in the molten slag layer, and the height-diameter ratio of the vortex is 0.5 when the vortex is formed.

The stirring speed of the stirring paddle and the conveying quantity of the mixed powder materials are adjusted so that the molten iron can be continuously and stably discharged, and at this time, the liquid level of the molten iron layer remains unchanged; when the upper edge of the vortex in the molten slag layer is located at the molten slag overflow opening, the reduced molten slag is discharged through the molten slag overflow opening; the position of the stirring paddle is adjusted through the lifting device so that the vertical distance between the stirring paddle and the liquid level of the molten iron layer is ½ of the height of the molten iron layer, and the stirring speed and the conveying quantity of the mixed powder materials are adjusted so that the molten iron is continuously discharged out of the outlet of the buffer tank and the reduced molten slag is continuously discharged out of the molten slag overflow opening.

After refining tail gas produced through a reaction in the reducing furnace is exhausted through the air exhaust opening, the exhausted tail gas enters a waste heat recovery system for waste heat recovery; when temperature is reduced to 200-300° C., the tail gas after waste heat recovery enters a flue gas purifying system, and carried dust is removed; and finally, the tail gas after dust removal is conveyed into a chimney through a draught fan and is discharged.

Embodiment 2

The adopted device is the same as that in embodiment 1 except the following aspects:
(1) The air inlet channel is an independent air inlet channel.
(2) The continuous feeding system is a feeding bin with a metering pump.

The method is the same as that in embodiment 1 except the following aspects:
(1) The mixed powder materials are placed in the feeding bin, and after being conveyed into an air inlet pipeline through the metering pump, the mixed powder materials enter the reducing furnace.
(2) The quantity of the reducing agent added is 1.2 times of the total quantity of C required for the complete reaction of Fe in the iron-containing mineral powder and C in the reducing agent, and the quantity of the slag former is 2.4 according to the alkalinity of the mixed powder materials.
(3) The furnace startup materials are the mixed powder materials, the volume of the furnace startup molten pool is 25% of the total volume of the reducing furnace, the furnace startup materials are heated in a manner that oxidizing combustibles are blown into the reducing furnace through the air inlet channel, the oxidizing combustibles are a mixture of natural gas and oxygen, and the mass ratio of C elements to O elements in the oxidizing combustibles is 3 to 8; and the position of the stirring paddle is adjusted through the lifting device, and the vertical distance between the stirring paddle and the liquid level of the furnace startup molten pool is controlled to be ½ of the height of the furnace startup molten pool.
(4) When the high-temperature molten pool is formed, the introduced oxidizing combustibles are the mixture of natural gas and oxygen, and the mass ratio of C elements to O elements in the oxidizing combustibles is 3 to 8.
(5) The height-diameter ratio of the vortex is 1.
(6) The vertical distance between the liquid level of the molten iron layer and the stirring paddle is ⅓ of the height of the molten iron layer.

Embodiment 3

The adopted device is the same as that in embodiment 1.
The method is the same as that in embodiment 1 except the following aspects:
(1) The quantity of the reducing agent added is 1.2 times of the total quantity of C required for the complete reaction of Fe in the iron-containing mineral powder and C in the reducing agent, and the quantity of the slag former is 2.8 according to the alkalinity of the mixed powder materials.
(2) The volume of the furnace startup molten pool is 30% of the total volume of the reducing furnace; and the position of the stirring paddle is adjusted through the lifting device, and the vertical distance between the stirring paddle and the liquid level of the furnace startup molten pool is controlled to be ½ of the height of the furnace startup molten pool.
(3) The mass ratio of the C elements to the O elements in the oxidizing combustibles is 3 to 5.
(4) The height-diameter ratio of the vortex is 1.5.

Embodiment 4

The adopted device is the same as that in embodiment 1.
The method is the same as that in embodiment 1 except the following aspects:
(1) The quantity of the reducing agent added is 1.3 times of the total quantity of C required for a complete reaction of Fe in the iron-containing mineral powder and C in the reducing agent, and the quantity of the slag former is 3 according to the alkalinity of the mixed powder materials.
(2) The furnace startup materials are the mixed powder materials, the volume of the furnace startup molten pool is 30% of the total volume of the reducing furnace, the furnace startup materials are heated in a manner that oxidizing combustibles are blown into the reducing furnace through the air inlet channel, the oxidizing combustibles are a mixture of natural gas and oxygen, and the mass ratio of C elements to O elements in the oxidizing combustibles is 3 to 6; and the position of the stirring paddle is adjusted through the lifting device, and the vertical distance between the stirring paddle and the liquid level of the furnace startup molten pool is controlled to be ½ of the height of the furnace startup molten pool.
(3) When the high-temperature molten pool is formed, the introduced oxidizing combustibles are the mixture of natural gas and oxygen, and the mass ratio of C elements to O elements in the oxidizing combustibles is 3 to 6.
(4) The height-diameter ratio of the vortex is 2.5.
(5) The vertical distance between the liquid level of the molten iron layer and the stirring paddle is ⅓ of the height of the molten iron layer.

What is claimed is:
1. A method for iron making by continuous smelting reduction, comprising the following steps:
(1) uniformly mixing iron-containing mineral powder with a reducing agent and a slag former to obtain mixed powder materials, and placing the mixed powder materials in a continuous feeding system which is a device capable of metering conveyed materials, and selecting a screw feeder or a feeding bin with a metering pump, wherein the iron-containing mineral powder is iron ore powder, or iron-containing tailing powder or iron-containing smelt slag with a mass percentage of full iron grade greater than or equal to 30%, the reducing agent is pulverized coal, the slag former is lime; in the mixed powder materials, the quantity of the reducing agent added is 1.1-1.3 times of a total quantity of C required for a complete reaction of Fe in the iron-containing mineral powder and C in the reducing agent;

the quantity of the slag former is determined so that alkalinity of the mixed powder materials is 2-3, and reaction formulas of the complete reaction are:

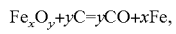

$Fe_xO_y+yC=yCO+xFe,$ 5

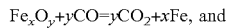

$Fe_xO_y+yCO=yCO_2+xFe,$ and

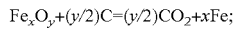

$Fe_xO_y+(y/2)C=(y/2)CO_2+xFe;$ (2) placing furnace startup materials in a reducing furnace, wherein a seal cover is assembled at a top of the reducing furnace, a stirring device is arranged at the top of the reducing furnace, the stirring device and a lifting device outside the reducing furnace are assembled together, a shaft rod of the stirring device penetrates through the seal cover to be inserted in the reducing furnace, a stirring paddle is assembled at a bottom end of the shaft rod, an air inlet channel and an air exhaust opening are also formed in the seal cover, a feed pipe penetrates through the seal cover to be inserted in the reducing furnace, a molten slag overflow opening is formed in an upper part of a side wall of the reducing furnace, an iron notch is formed in a bottom of the reducing furnace and communicates with a siphon pipeline, and the siphon pipeline communicates with a buffer tank; heating the furnace startup materials to be in a molten state to form a furnace startup molten pool, wherein the furnace startup materials are pig iron, or the mixed powder materials in step (1), when the furnace startup materials are made into the furnace startup molten pool, a temperature of the furnace startup molten pool is controlled to be greater than or equal to 1450° C., a volume of the furnace startup molten pool is 20-30% of a total volume of the reducing furnace, when the furnace startup materials are the pig iron, the furnace startup materials are heated in an induced heating manner, when the furnace startup materials are the mixed powder materials, the furnace startup materials are heated in a manner that oxidizing combustibles are blown into the reducing furnace through the air inlet channel, the oxidizing combustibles are a mixture of pulverized coal and oxygen, or a mixture of natural gas and oxygen, a mass ratio of C elements to O elements in the oxidizing combustibles is 3:4-8, an outlet end of the feed pipe is located near the shaft rod, when a vortex is formed in a high-temperature molten pool in step (4), the mixed powder materials entering the reducing furnace fall into a center of the vortex, and at this time, the outlet end of the feed pipe is located above the vortex;

(3) lowering the stirring paddle into the furnace startup molten pool through the lifting device, starting the stirring device to stir the furnace startup molten pool, adjusting a position of the stirring paddle through the lifting device, controlling a vertical distance between the stirring paddle and a liquid level of the furnace startup molten pool to be ⅓-½ of a height of the furnace startup molten pool, at the same time, enabling the continuous feeding system to continuously convey the mixed powder materials into the reducing furnace through the feed pipe, and blowing oxidizing combustibles into the reducing furnace through the air inlet channel to heat the mixed powder materials in the reducing furnace, wherein the oxidizing combustibles are the mixture of the pulverized coal and the oxygen, or the mixture of the natural gas and the oxygen, the mixed powder materials are heated to melt in the reducing furnace, the molten mixed powder materials and the furnace startup molten pool form the high-temperature molten pool together, at the same time, the mixed powder materials are subjected to a reduction reaction to generate molten iron and reduced molten slag, and an introduction quantity of the oxidizing combustibles is determined based on a standard of controlling a temperature of the high-temperature molten pool to be greater than or equal to 1450° C.;

(4) under an action of a stirring centrifugal force and a coupling action of a gravity difference between the molten iron and the reduced molten slag, enabling the molten iron and the reduced molten slag to be separated quickly to form a molten slag layer in an upper part of the high-temperature molten pool and a molten iron layer in a lower part of the high-temperature molten pool, enabling the molten iron of the molten iron layer to enter the buffer tank from the iron notch through the siphon pipeline, along with an increase of a liquid level height of the high-temperature molten pool, when the molten iron is discharged out of an outlet of the buffer tank, adjusting the position of the stirring paddle through the lifting device, raising the stirring paddle into the molten slag layer, and performing vortex stirring on the molten slag layer through the stirring paddle so that the vortex is formed in the molten slag layer; and (5) adjusting a stirring speed of the stirring paddle and a conveying quantity of the mixed powder materials so that the molten iron is continuously and stably discharged, and at this time, a liquid level of the molten iron layer remains unchanged; when an upper edge of the vortex in the molten slag layer is located at the molten slag overflow opening, discharging the reduced molten slag through the molten slag overflow opening; adjusting the position of the stirring paddle through the lifting device, so that a vertical distance between the stirring paddle and the liquid level of the molten iron layer is ⅓-½ of a height of the molten iron layer; and adjusting the stirring speed and the conveying quantity of the mixed powder materials, so that the molten iron is continuously discharged out of the outlet of the buffer tank and the reduced molten slag is continuously discharged out of the molten slag overflow opening.

2. The method for iron making by continuous smelting reduction according to claim 1, wherein in step (3), a mass ratio of C elements to O elements in the oxidizing combustibles is 3:4-8.

3. The method for iron making by continuous smelting reduction according to claim 1, wherein in step (4), a height-diameter ratio of the vortex is 0.5-2.5 when the vortex is formed, and after the vortex is formed, the mixed powder materials entering the reducing furnace are drawn and sucked into the high-temperature molten pool under an action of negative pressure of the center of the vortex, and are uniformly dispersed under an action of the vortex stirring.

4. The method for iron making by continuous smelting reduction according to claim 1, wherein the stirring speed is 50-200 r/min when the stirring paddle performs the vortex stirring.

5. The method for iron making by continuous smelting reduction according to claim 1, wherein an iron reduction rate of the iron-containing mineral powder is greater than or equal to 95.5%, and a mass percentage of iron in the reduced molten slag is less than or equal to 0.35%.

\* \* \* \* \*